UNITED STATES PATENT OFFICE.

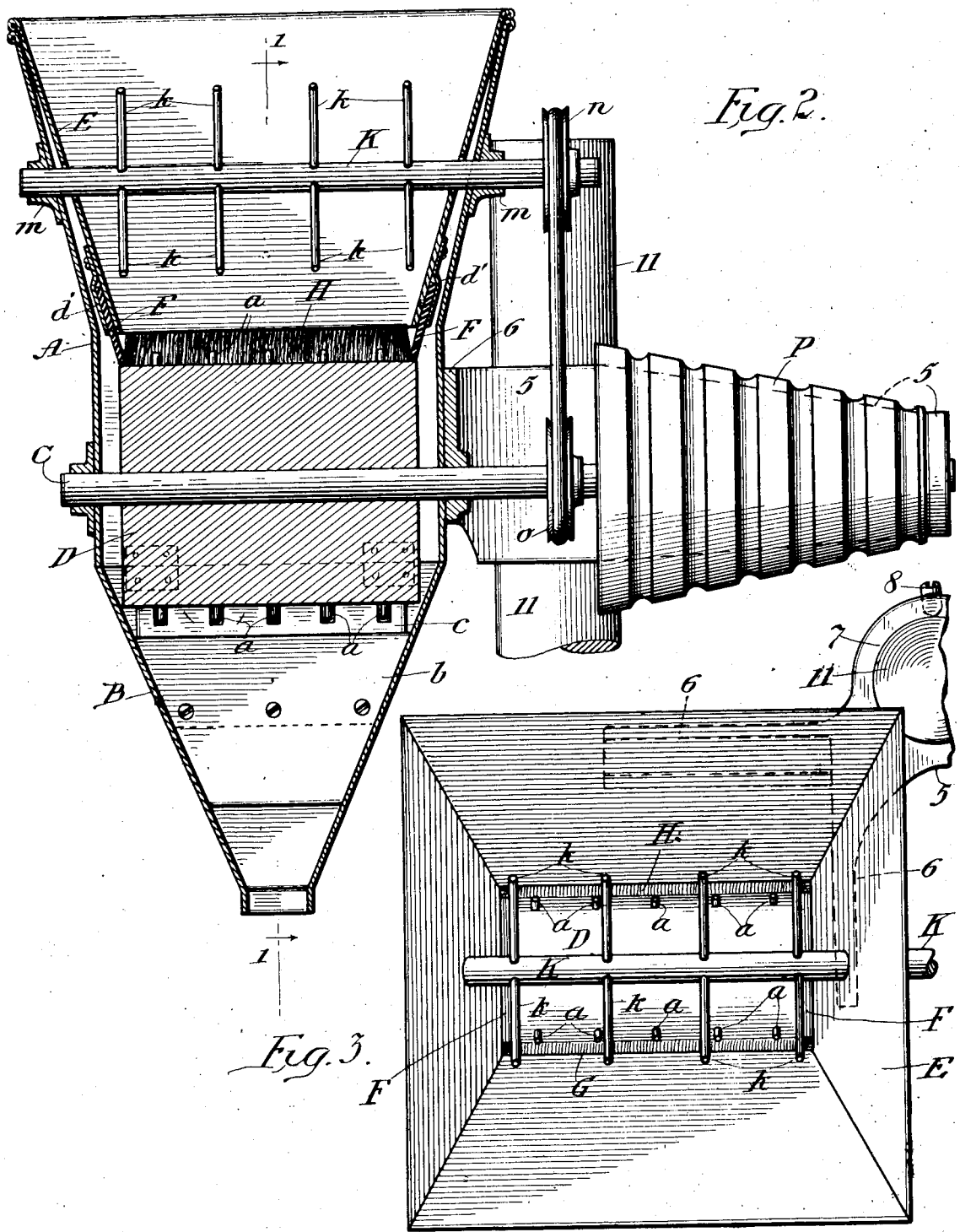

PETRONELLA EDTBAUER, OF CHICAGO, ILLINOIS.

FEED-REGULATOR.

1,330,179.

Specification of Letters Patent. Patented Feb. 10, 1920.

Application filed April 12, 1917. Serial No. 161,440.

*To all whom it may concern:*

Be it known that I, PETRONELLA EDTBAUER, a citizen of the United States, residing at Chicago, in the county of Cook and State of Illinois, have invented new and useful Improvements in Feed-Regulators, of which the following is a full, clear, and exact description.

My invention relates to a machine for breaking up lumps of material of a granular character, and particularly food products preparatory to weighing the same.

The object of my invention is to so construct such a machine that it will thoroughly agitate the material thrown into its hopper; will regulate the feed and cause the material to flow therefrom in a steady even flow; will prevent leakage at the ends of the drum and at the incoming side of the same, and can be taken apart and kept thoroughly clean and sanitary. This I accomplish by the means hereinafter fully described, and as particularly pointed out in the claims.

In the drawings:

Fig. 2 is a vertical section of the same taken on dotted line 2—2, Fig. 3.

Fig. 3 is a plan view of said machine.

Figure 1:
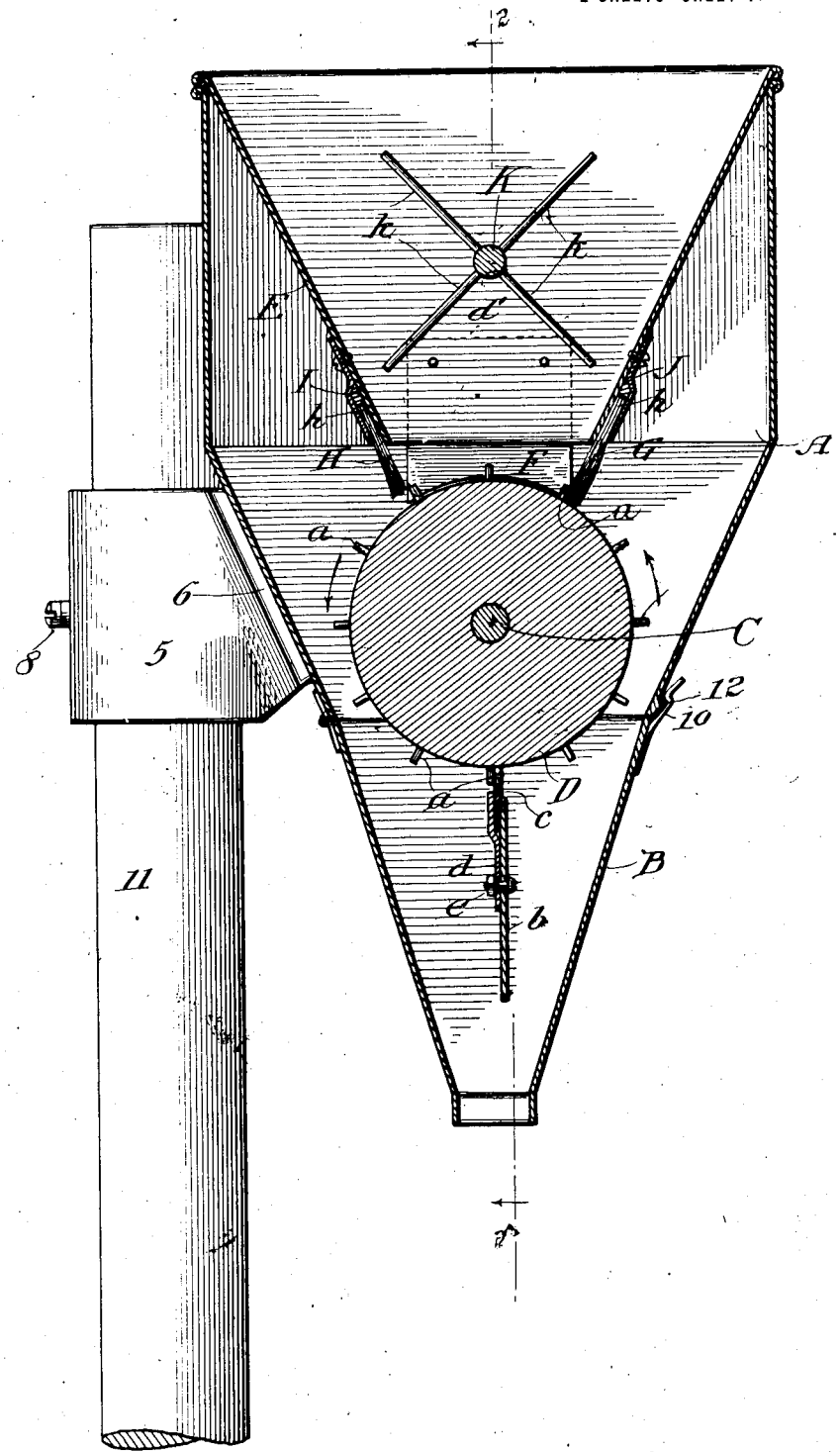
Figure 1 is a vertical section of my improved granulating machine taken on dotted line 1—1, Fig. 3.

The machine to which my improvements apply has an outer shell or casing A which has an upper and a lower section. The edges of the open upper end of the upper section are substantially square; its front and rear walls are vertical and its side walls are inclined inward toward each other slightly as they extend downward. The walls of the lower section are a continuation of the walls of the upper section, excepting that its rear and front walls incline toward each other as they extend downward and its side walls are vertical. A transverse shaft C is journaled in suitable bearings in these side-walls, one end of which extends through its bearings and has its extremity journaled in the end of a bracket 5, which latter projects from angle plates 6, 6, that are secured to the sides of the lower section of the casing, substantially as shown in the drawings, and has a comparatively large vertical opening 7 therein near the confluence of said plates 6, 6, which is adapted to slip over a standard or post 11 and be secured thereon in any position shown by means of set-screws 8.

The lower transversely elongated open end of the lower section of casing A discharges into an inverted pyramidal shaped funnel B. The walls of this funnel form a continuation of the walls of the casing, although the upper edges thereof lap over the lower edges of the lower section of the same and are hinged to said casing by hinges 9 located in the rear. When this funnel is closed over the lower end of the lower section in this manner a snap catch 10 engages a suitable shoulder 12 secured to and projecting from the front of the lower section.

Between its bearings in the side walls of the lower section of casing A, shaft C has a comparatively large cylindrical drum D securely mounted thereon. This drum D is provided with several circumferentially arranged series of pins *a*, *a* projecting from its periphery, and below this drum funnel B has the sides thereof connected by a vertical partition *b*, the upper edge of which is below the periphery of and parallel to the axis of drum D. This partition has a flexible scraper *c* of rubber or other suitable material secured to and projecting above its upper edge and is adjustably clamped thereto by means of a clamping-plate *d*, which latter is secured to the partition by means of bolts and nuts *e* or in any other suitable manner. This scraper impinges against the periphery of the drum, and it is provided with a series of slits in its upper edge that are located with reference to and permit the passage of pins *a*, *a*, as the cylinder revolves.

A suitable hopper E whose upper open end corresponds in transverse dimensions with those of casing A and which has its upper edges rolled, is inserted in the upper section of the casing. The sides of this section of the casing incline inward at a greater angle than the sides of said upper section and terminate a short distance above drum D. The sides of the hopper that are disposed at right angles to the axis of the drum have flexible retaining-walls F secured thereto by means of clamping-plates *d*, that are screwed or otherwise secured to the same. These retaining walls are, preferably, made of rubber and extend down below the lower edges of the hopper, and their lower edges are cut so as to correspond to a curve which is the obverse of the uppermost segment of the periphery of the drum against which said edges impinge to prevent the escape of any material from the hopper in an endwise direction off of the drum.

The lower edges of the hopper that are parallel to the axis of the drum terminate in the same plane as the lower edges of the end-walls of the hopper and have longitudinally disposed brushes G and H, respectively, secured thereto. The backs $h$ of these brushes are removably clamped against the sides of the lower portions of the front and rear walls of the hopper and are held in such positions by means of clamping-plates I and J, which latter have their upper portions secured to the hopper by screws or otherwise, and have their lower portions off-set so as to clamp the said backs $h$ of the brushes between them and said hopper. The brush portion of the front brush G extends to and comes in contact with the circumference of the drum, but the brush portion of the rear brush H extends toward and terminates a distance from the periphery of the drum a distance corresponding to the length of pins $a$ projecting from said drum. Brush H, however, is adapted to be adjusted to and from the periphery of the drum according to the length of pins $a$ and determines and controls the flow of the material from the hopper.

The construction of the lower portion of the hopper E, which includes the brushes and the resilient end walls F—F, permits this portion to yield and restore itself, thereby preventing breakage or distortion of this portion, when a large mass or unbroken portion of material becomes lodged between the feed roller and the breaker. This construction also eliminates the necessity of removing the hopper to straighten the walls thereof each time the above condition occurs, and further insures the material being kept between the feed roller and in the path of the breaker.

At a suitable distance above its lower edges, a horizontal shaft K, whose axis is parallel to shaft D extends through the hopper and out through suitable bearings $m$, $m$, in the end walls of the casing. This shaft is provided with several series of equidistant arms $k$, $k$, that are designed to rotate and stir and break the material in the hopper before it comes in contact with the drum. Shaft K extends out through its bearings at one end and has a concaved wheel $n$ securely mounted thereon, and shaft C extends through its bearings at the same end of the machine and is provided with a concaved wheel $o$ which is rigidly mounted thereon, and beyond this wheel $o$ said shaft C has a cone-shaped drive-pulley P, which, preferably, has a series of circumferential grooves therein which is engaged and driven by a suitable belt (not shown).

If desired, hopper E can be removed after arms $k$ have been removed from shaft K and said shaft withdrawn longitudinally therefrom, and a hopper with a smaller discharge opening substituted therefor. Or it can be thus removed and the brushes removed from the edges of its discharge opening and cleansed or new ones substituted therefor. By unfastening the catch 10, funnel B can be swung rearwardly so as to leave the lowermost portion of the drum exposed for cleansing the same, whenever desired, and the scraper can also be cleansed or removed and another substituted therefor, whenever it is deemed necessary. Thus the machine can be easily kept in a perfectly clean and sanitary condition at all times without impairing the efficiency of the machine.

What I claim as new is:

1. In a feed regulator, the combination with a feed roller, a breaker of a hopper therefor spaced above the roller, and flexible extensions depending from three sides of the lower perimeter of the hopper into contact with and completely inclosing three sides of a portion of the surface of the roller, said flexible extensions tending to keep the material between the breaker and the roller.

2. In a feed regulator, the combination with a casing, a removable hopper supported by and arranged within the same, a removable shaft journaled in opposite walls of and traversing said casing and holding the hopper with relation thereto and traversing the hopper and loosely engaging apertures provided in opposite walls of the hopper, and stirring rods removably fixed upon said shaft within the hopper.

3. In a feed regulator, the combination with a casing, a removable hopper therein, a removable shaft journaled in opposite walls of and traversing the casing, and the hopper and loosely engaging apertures provided in opposite walls of the latter; said shaft assisting to hold the hopper with respect to the casing, stirring rods removably fixed upon said shaft within the hopper, and a feed roller spaced below the hopper and journaled in the casing, flexible extensions depending from three sides of the lower perimeter of the hopper that come in contact with and inclose three sides of a portion of the surface of said roller, said flexible extensions tending to keep the material between the stirring rods and the feed rollers.

4. In a machine of the kind specified, the combination with a suitable casing and a rotatable drum journaled therein having a horizontal axis and provided with pins whose axis is horizontal, and suitably disposed pins projecting from its circumference, of a removable hopper, a transverse shaft whose axis is parallel to that of said drum and which extends through said hopper and through the ends thereof, and is journaled in the casing; said shaft having breaker elements, and means secured to the edges of the discharge opening that prevent the yieldable escape of the material fed to said drum from the incoming side of said drum and from the ends thereof and keep the material between the breaker element and the drum.

In witness whereof I have hereunto set my hand this 3d day of April, 1917.

PETRONELLA EDTBAUER.

Witnesses:
 FRANK D. THOMASON,
 FLORENCE MITCHELL.